US012416895B2

(12) United States Patent
Doi

(10) Patent No.: US 12,416,895 B2
(45) Date of Patent: Sep. 16, 2025

(54) IMAGE FORMING APPARATUS INCLUDING A PLURALITY OF DOORS THAT ARE OPENED AND CLOSED

(71) Applicant: CANON KABUSHIKI KAISHA, Tokyo (JP)

(72) Inventor: Shigeo Doi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/629,663

(22) Filed: Apr. 8, 2024

(65) Prior Publication Data

US 2024/0345532 A1 Oct. 17, 2024

(30) Foreign Application Priority Data

Apr. 12, 2023 (JP) ................................ 2023-065263

(51) Int. Cl.
*G03G 21/00* (2006.01)
*G03G 21/16* (2006.01)

(52) U.S. Cl.
CPC ..... *G03G 21/1633* (2013.01); *B65H 2402/45* (2013.01); *B65H 2405/115* (2013.01); *G03G 2221/1654* (2013.01); *G03G 2221/169* (2013.01)

(58) Field of Classification Search
CPC ......... G03G 21/1633; G03G 2221/169; G03G 2221/1654; B65H 2402/45; B65H 2405/115
USPC .......................................................... 399/124
See application file for complete search history.

(56) References Cited

U.S. PATENT DOCUMENTS 6,374,067 B1 * 4/2002 Park ........................ E05D 3/022 399/110
11,281,152 B1 * 3/2022 Kokubu ............. G03G 21/1633
2010/0098473 A1 * 4/2010 Hosoi ................ G03G 21/1642 271/225
2010/0246109 A1 * 9/2010 Matsubara ......... G03G 21/1633 361/679.01
2011/0123217 A1 * 5/2011 Matsui ............... G03G 21/1633 399/107
2016/0033928 A1 * 2/2016 Ishimitsu ............. G10K 11/002 399/110
2016/0291534 A1 * 10/2016 Maeda ............... G03G 21/1633
2018/0150021 A1 * 5/2018 Yamamoto ......... G03G 21/1609

FOREIGN PATENT DOCUMENTS

JP 2021022584 A 2/2021

* cited by examiner

*Primary Examiner* — Robert B Beatty
(74) *Attorney, Agent, or Firm* — Canon U.S.A., Inc. IP Division

(57) ABSTRACT

An image forming apparatus includes a housing to store an image forming unit that forms an image on a sheet, doors, a cover part, and holding members. Each of the doors rotates around a rotational axis to be opened and closed relative to the housing and includes a positioning shaft and a projection. When each of the doors is in an opened state, an inside of the image forming apparatus is exposed. The cover part is provided in the housing and has fitting holes into which the positioning shafts are fitted. Each of the holding members holds a different one of the doors in a closed state. When each of the doors is in the closed state, each of the positioning shafts included in the doors is fitted into a different one of the fitting holes.

14 Claims, 12 Drawing Sheets

IMAGE FORMING APPARATUS INCLUDING A PLURALITY OF DOORS THAT ARE OPENED AND CLOSED

BACKGROUND

Field

The present disclosure relates to an image forming apparatus including a plurality of doors that are opened and closed.

Description of the Related Art

There have been conventionally known a configuration of an image forming apparatus in which an openable and closable door is provided in the housing of the image forming apparatus such that a user can access the inside of the image forming apparatus by opening the door.

Japanese Patent Application Laid-Open No. 2021-22584 discusses an image forming apparatus that includes an openable and closable door that rotates around a rotational shaft and is openable and closable relative to the housing of the image forming apparatus.

As to a door that rotates around a rotational shaft as described above, when the door is closed, the position of the door relative to the housing of the image forming apparatus may deviate from a design value due to positional misalignment of the door at the time of attachment or deviation or wobbling of a hinge having the rotational shaft. In particular, in an image forming apparatus in which a plurality of doors is arranged side by side in a vertical direction, if the positions of the plurality of doors relative to the housing deviate from the respective design values when the plurality of doors is closed, relative positional misalignment may occur between adjacent doors among the plurality of doors. In the case where the plurality of doors is arranged side by side in the vertical direction in particular, the misalignment between the relative positions of the adjacent doors in a horizontal direction can be easily perceived by users, and the quality of the outer appearance may become deteriorated.

SUMMARY

The present disclosure is directed to, in an image forming apparatus including a plurality of doors, reducing misalignment between relative positions of adjacent doors in a horizontal direction.

According to an aspect of the present disclosure, an image forming apparatus including an image forming unit configured to form an image on a sheet, the image forming apparatus includes a housing configured to store the image forming unit, a plurality of doors, each of which rotates around a rotational axis so as to be opened and closed with respect to the housing and includes a positioning shaft and a projection, wherein, when each of the plurality of doors is in an opened state, an inside of the image forming apparatus is exposed, a cover part that is provided in the housing and has a plurality of fitting holes into which the positioning shafts are fitted, and a plurality of holding members, each of which holds a different one of the plurality of doors in a closed state, wherein, when each of the plurality of doors is in the closed state, each of the positioning shafts included in the plurality of doors is fitted into a different one of the plurality of fitting holes.

Further features of the present disclosure will become apparent from the following description of exemplary embodiments with reference to the attached drawings.

DESCRIPTION OF THE EMBODIMENTS

Hereinafter, exemplary embodiments of the present disclosure will be described.

Exemplary embodiments of the present disclosure will be described in a detailed and exemplified manner with reference to the drawings. In the following exemplary embodiments, as illustrated in FIG. 1, as viewed from an image forming system 100, the direction toward the front side is defined as frontward direction F, the direction toward the back side (rear side) is defined as backward direction B, the direction toward the left side is defined as leftward direction L, the direction toward the right side is defined as rightward direction R, the direction toward the upper side is defined as upward direction U, and the direction toward the lower side is defined as downward direction D.

However, the dimensions, materials, shapes, and relative arrangements of the components described in the following exemplary embodiments are to be changed as appropriate depending on the configuration of the device to which the present disclosure is applied and various conditions, and they are not intended to limit the scope of the present disclosure thereto.

(Image Forming System)

Figure 1:
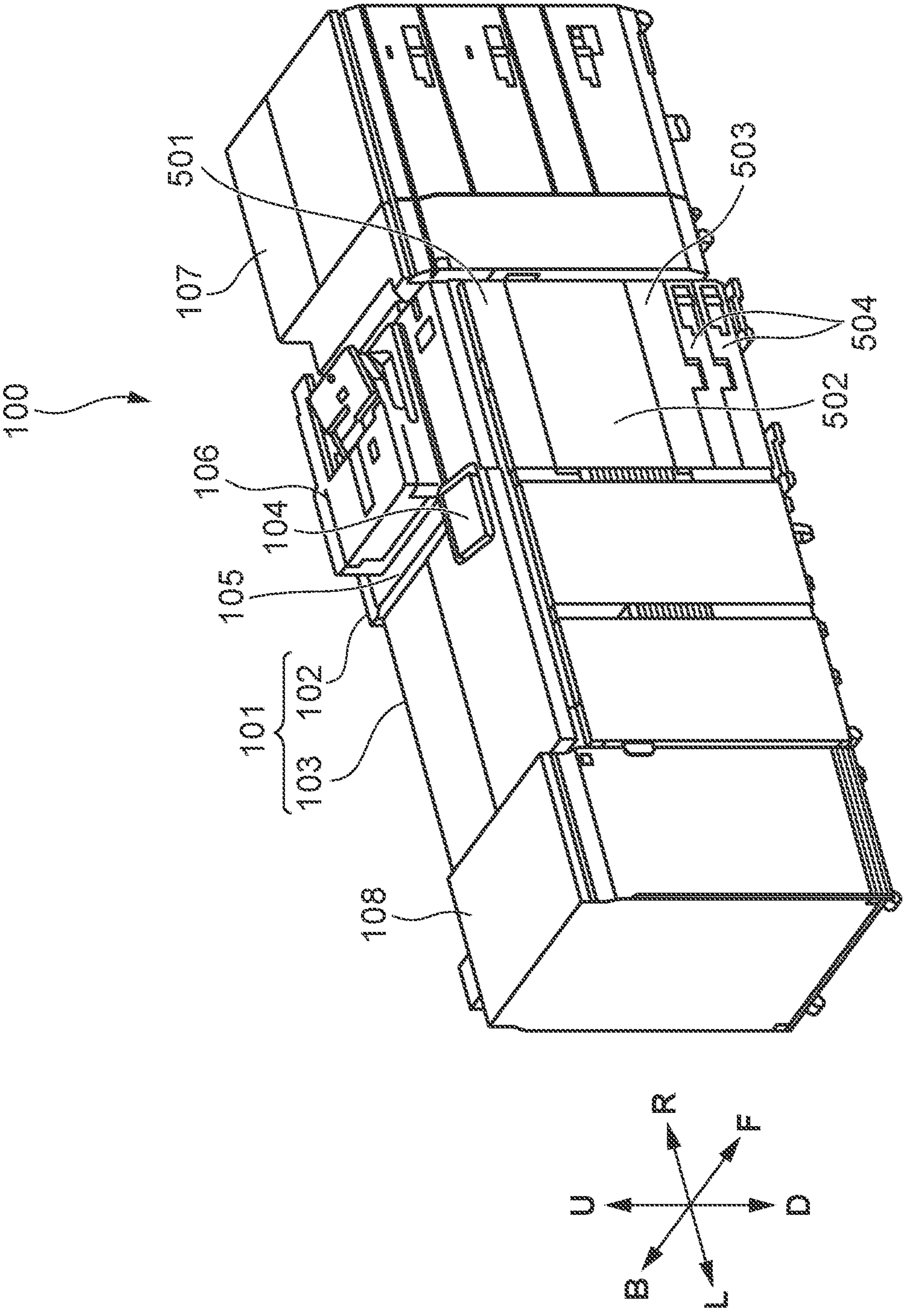
FIG. 1 is a perspective view of an image forming system.
Figure 2:
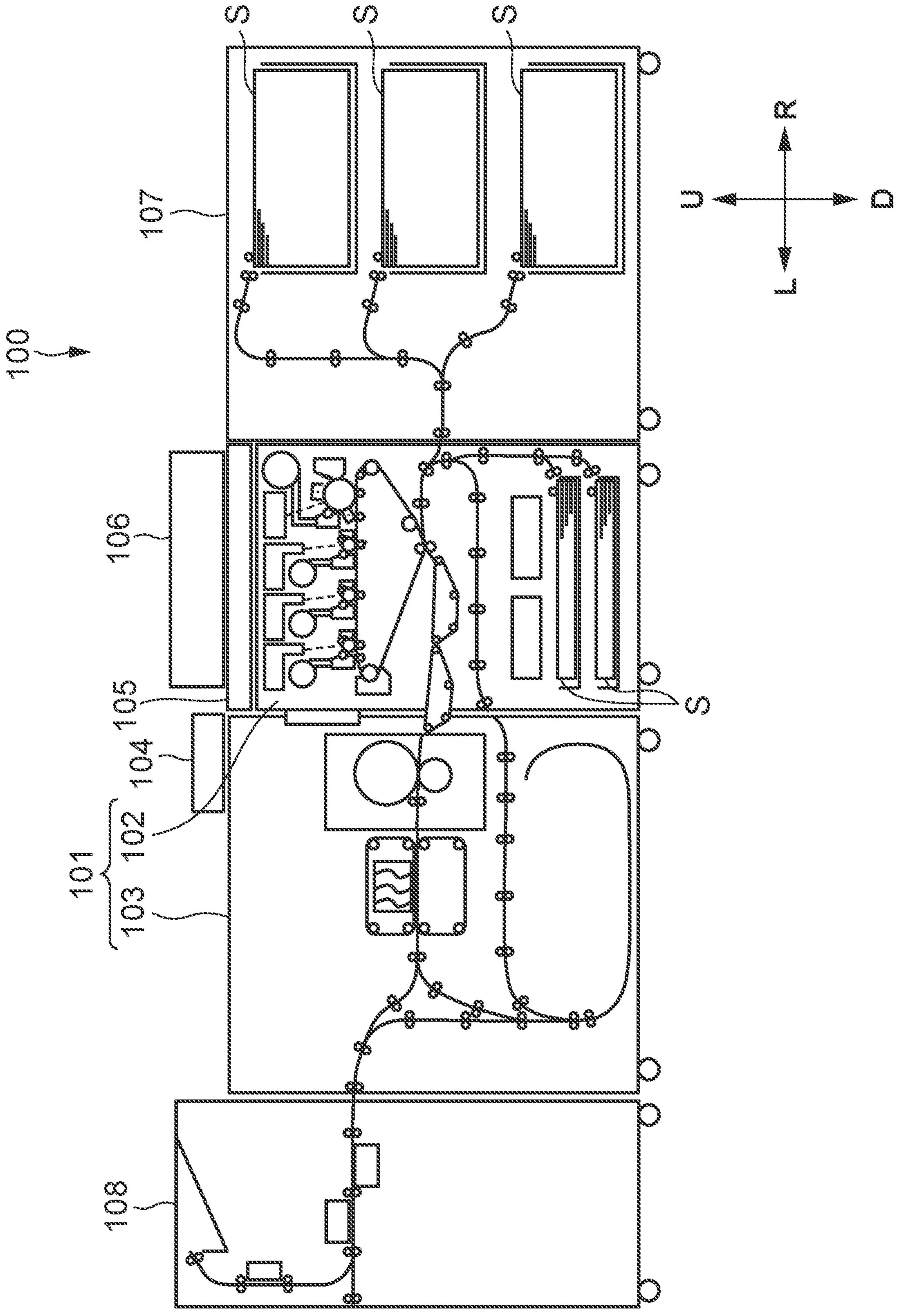
FIG. 2 is a schematic cross-sectional view of the image forming system.

FIG. 1 is a perspective view of the image forming system 100 according to a first exemplary embodiment. FIG. 2 is a schematic cross-sectional view of the image forming system 100.

The image forming system 100 includes an image forming apparatus 101, a large-capacity feeding device 107, and a sensing device 108. The image forming apparatus 101 includes an image forming unit 102 and a fixing conveyance unit (fixing unit) 103. The image forming unit 102 forms a toner image on a recording medium S (hereinafter, called sheet S) fed from the large-capacity feeding device 107 (feeding device) 107. The fixing conveyance unit 103 fixes the toner image formed by the image forming unit 102 to the sheet S. The image forming unit 102 and the fixing conveyance unit 103 are formed in separate housings. With this configuration, even if the image forming apparatus 101 is of a large size, it is possible to pack and transport the image forming apparatus 101 in a state of being separated into the housings. This improves workability in the physical distribution of the large-sized image forming apparatus 101 from shipment to installation.

Provided on the top of the fixing conveyance unit 103 is an operation unit 104 that is used by an operator to operate the image forming apparatus 101. The operation unit 104 can be freely changed in position on the upper surface of the image forming system 100.

The image forming system 100 also includes a document read device 105 and an automatic document feeding device 106 on the top of the image forming unit 102. The automatic document feeding device 106 feeds documents one by one from a batch of stacked documents to the document read device 105. The document read device 105 reads the image on the document fed by the automatic document feeding device 106 or the image on the document placed on platen glass (not illustrated).

The document read device 105 and the automatic document feeding device 106 are selectively connected as options to the image forming unit 102.

The large-capacity feeding device 107 is arranged upstream of the image forming unit 102 with respect to the sheet conveyance direction. The large-capacity feeding device 107 includes a plurality of sheet storage parts. Instead of the large-capacity feeding device 107, a manual feeding device (not illustrated) or a long-sheet feeding device capable of storing long sheets are selectively connected to the image forming unit 102. Further upstream of the large-capacity feeding device 107, another large-capacity feeding device (not illustrated), another manual feeding device (not illustrated), or another long-sheet feeding device (not illustrated) can be selectively connected additionally.

Further, in the image forming system 100 of the present exemplary embodiment, the sensing device 108 is arranged downstream of the fixing conveyance unit 103 with respect to the sheet conveyance direction. However, the sensing device 108 needs not necessarily to be provided but is selectively connected.

In the image forming system 100 of the present exemplary embodiment, post-processing devices not illustrated, such as a discharge tray, a large-capacity stacker, a finisher, and a trimmer, can be selectively connected via the sensing device 108, and the sheet S on which an image has been formed by the image forming apparatus 101 is fed to a post-processing device that is connected depending on the purpose.

The sensing device 108 here reads an image on one side or both sides of the sheet S, detects the image density and displacement of the image position, and performs feedback correction to an image signal from the image forming unit 102 based on the detected information.

As described above, when a variety of option devices is selectively connected, the image forming apparatus 101 of the present exemplary embodiment can output products obtained by applying various types of post-processing treatment on various types in an in-line process. This makes it possible to provide the image forming system 100 that achieves high productivity, high image quality, high stability, and high functionality.

(Image Forming Unit)

The image forming unit 102 of the image forming apparatus 101 according to the present exemplary embodiment will be described with reference to FIGS. 3A to 3C.

Figure 3A:
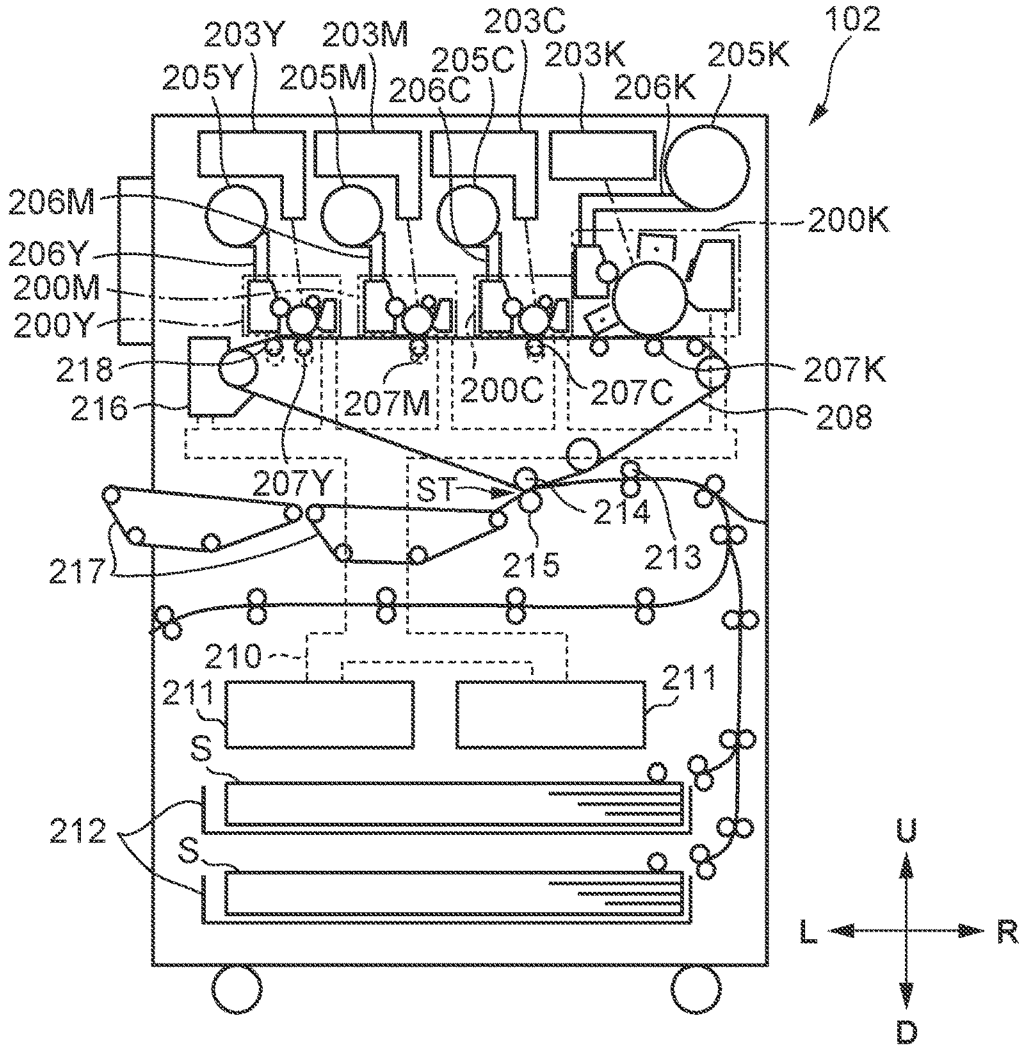
FIGS. 3A to 3C are schematic cross-sectional views of an image forming unit.

FIG. 3A is a schematic cross-sectional view of the image forming unit 102.

The image forming unit 102 includes, as individual image forming units, a yellow image forming station 200Y, a magenta image forming station 200M, a cyan image forming station 200C, and a black image forming station 200K. The image forming unit 102 also includes laser scanners 203Y, 203M, 203C, and 203K, toner bottles (toner containers) 205Y, 205M, 205C, and 205K, and toner supply paths 206Y, 206M, 206C, and 206K in correspondence with the image forming stations 200Y, 200M, 200C and 200K, respectively.

Besides those described above, the image forming unit 102 includes primary transfer rollers 207Y, 207M, 207C, and 207K, an intermediate transfer belt 208, a toner collection path 210, collected toner containers 211, and sheet storage parts 212.

Further, the image forming unit 102 includes a registration roller 213, a secondary transfer inner roller 214, a secondary transfer outer roller 215, an intermediate transfer belt cleaner 216, a pre-fixing conveyance belt 217, and a primary transfer auxiliary roller 218. The nip portion between the secondary transfer inner roller 214 and the secondary transfer outer roller 215 forms a secondary transfer portion ST.

The yellow image forming station 200Y, the magenta image forming station 200M, and the cyan image forming station 200C have the same structure, which is different from that of the black image forming station 200K.

Figure 3B:
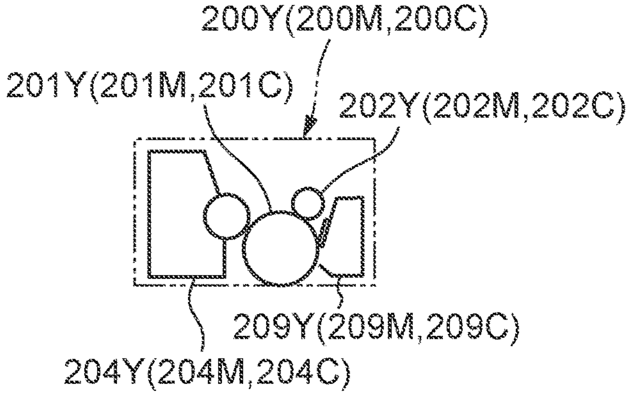

FIG. 3B is a diagram illustrating the yellow image forming station 200Y as a representative of the yellow image forming station 200Y, the magenta image forming station 200M and the cyan image forming station 200C.

The image forming station 200 includes a photoconductive drum 201, and a primary charger 202, a development device 204, and a photoconductive drum cleaner 209 are provided around the photoconductive drum 201. The primary charger 202 is of a charging roller type.

Figure 3C:
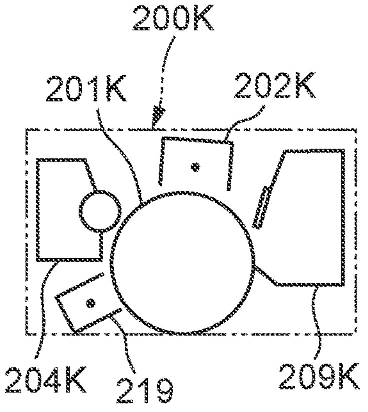

FIG. 3C is a diagram illustrating the black image forming station 200K.

Similarly, the black image forming station 200K includes a photoconductive drum 201K, and a primary charger 202K, a development device 204K, and a photoconductive drum cleaner 209K are provided around the photoconductive drum 201K. This station alone also includes a pre-transfer charger 219. The primary charger 202K is of a corona charging type.

(Image Forming Process)

The image forming processes in these stations are the same except for the colors of the toners, and thus the image forming process in the yellow image forming station 200Y will be described as a representative.

Referring to FIG. 3B, the surface of the photoconductive drum 201Y in the yellow image forming station 200Y is evenly charged by the primary charger 202Y. Referring to FIG. 3A, the laser scanner 203Y emits laser light to the photoconductive drum 201Y in accordance with image data, thereby forming an electrostatic latent image on the surface of the photoconductive drum 201Y. The development device 204Y develops the electrostatic latent image with yellow toner, thereby forming a yellow toner image on the surface of the photoconductive drum 201Y. When the toner in the development device 204Y is consumed by this development, the toner is supplied as appropriate from the tonner bottle 205Y to the development device 204Y through the toner supply path 206Y.

Next, a predetermined pressing force and an electrostatic load bias are applied to the toner image on the surface of the photoconductive drum 201Y by the primary transfer roller 207Y, and the toner image on the surface of the photoconductive drum 201Y is transferred onto the intermediate transfer belt 208.

After the transfer, the toner slightly left on the photoconductive drum 201Y is removed by the photoconductive drum cleaner 209Y. The removed toner is collected by the collected toner containers 211 through the toner collection path 210.

Similarly, the toner images formed on the other stations are transferred in sequence onto the intermediate transfer belt 208, and the four toner images are superimposed on top of one another on the belt.

On the other hand, the sheets S are fed one by one from one of the sheet storage parts 212 of the image forming unit 102 or from the large-capacity feeding device 107, and are conveyed to the registration roller 213. The leading end of each sheet S contacts the nip portion of the stopped registration roller 213, the sheet S is formed in a loop shape, and the skew of the sheet S is corrected. Thereafter, the registration roller 213 starts to rotate and convey the sheet S to the secondary transfer portion ST such that the leading end of the toner image on the intermediate transfer belt 208 and the leading end of the sheet S are aligned with each other at the secondary transfer portion ST. A predetermined pressing force and an electrostatic load bias are applied to the toner image on the intermediate transfer belt 208 at the secondary transfer portion ST, and the toner image on the intermediate transfer belt 208 is transferred onto the sheet S.

After the transfer, the toner slightly left on the intermediate transfer belt 208 is removed by the intermediate transfer belt cleaner 216. The removed toner is collected by the collected toner containers 211 through the toner collection path 210.

The sheet S onto which the toner image has been transferred is conveyed to the fixing conveyance unit 103 by the pre-fixing conveyance belt 217.

(Fixing Conveyance Unit)

Figure 4:
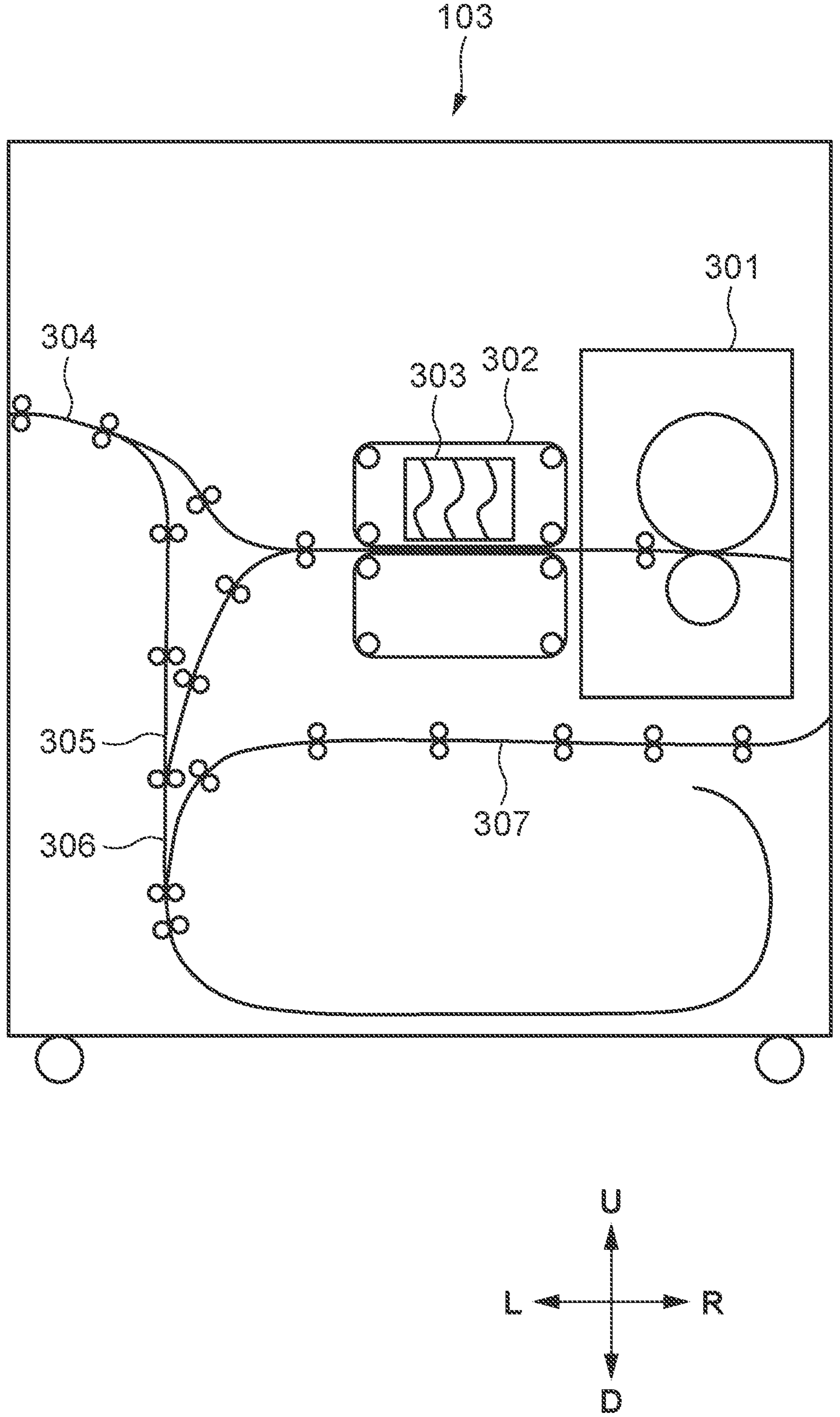
FIG. 4 is a schematic cross-sectional view of a fixing conveyance unit.

FIG. 4 is a schematic cross-sectional view of the fixing conveyance unit 103.

The fixing conveyance unit 103 includes a fixing unit 301, a cooling unit 302, a heat sink 303, a discharge conveyance path 304, a discharge reversing unit 305, a double-sided reversing unit 306, and a double-sided conveyance path 307.

The fixing unit 301 heats and presses the toner image on the sheet S conveyed from the image forming unit 102 to fix the toner image to the sheet S. The heated sheet S is cooled by heat absorption by the heat sink 303 arranged in the cooling unit 302. After that, the sheet S is discharged to the sensing device 108 through the ejection conveyance path 304.

In the case of reversing the front and back of the sheet S and discharging the sheet S, the sheet S is switched back at the discharge reversing unit 305 to switch the leading end and trailing end of the sheet S, and the sheet S in the front-back reversed state is discharged through the ejection conveyance path 304.

In the case of forming images on the both sides of the sheet S, the sheet S with an image formed on a first side of the sheet S is switched back at the double-sided reversing unit 306 to switch the leading end and trailing end of the sheet S, and the sheet S in the front-back reversed state is conveyed to the double-sided conveyance path 307. After that, the sheet S and the subsequent sheet fed from the sheet storage part 212 of the image forming unit 102 or the large-capacity feeding device 107 are conveyed to the registration roller 213 in sequence. Then, an image is formed on a second side of the sheet S in the same image forming process as that of the first side, and the sheet S is discharged through the discharge conveyance path 304.

(Monochrome Image Formation)

As described above, the image forming apparatus 101 according to the present exemplary embodiment can form a full-color image using the yellow image forming station 200Y, the magenta image forming station 200M, the cyan image forming station 200C, and the black image forming station 200K, and can also form a monochrome image using the black image forming station 200K alone.

In forming a monochrome image, the primary transfer rollers 207Y, 207M, and 207C, the primary transfer auxiliary roller 218, and the intermediate transfer belt 208 are moved by a separation mechanism (not illustrated) to positions indicated by dotted lines in FIG. 3A. Accordingly, the rotational driving of the color image forming stations 200Y, 200M, and 200C separated from the intermediate transfer belt 208 are stopped. That is, in the color image forming stations 200Y, 200M, and 200C, the components constituting the color image forming stations 200Y, 200M and 200C can be prevented from wearing out due to unnecessary rotational driving, and thus the components can achieve longer lives.

Since the photoconductive drum 201K in the black image forming station 200K is larger in diameter than the photoconductive drums 201Y, 201M, and 201C in the color image forming stations 200Y, 200M and 200C, the photoconductive drum 201K is longer in lifetime than the photoconductive drum 201Y, 201M, and 201C in the color image forming stations 200Y, 200M and 200C.

Besides, the primary charger 202K in the black station is of a contactless corona charging type, which is longer in lifetime than the primary chargers 202Y, 202M, and 202C in the color image forming stations 200Y, 200M and 200C that are of a contact charging roller type.

In addition, the toner bottle 205K in the black image forming station 200K has a larger capacity than those of the toner bottles 205Y, 205M, and 205C in the color image forming stations 200Y, 200M and 200C, which is suitable for achieving a longer lifetime.

Accordingly, it is possible to suppress excessive increase in the running cost of the image forming apparatus 101 even if monochrome image formation is executed at a higher ratio than color image formation in the image forming apparatus 101.

Since the primary charging methods are different between the color image forming stations 200Y, 200M and 200C and the black image forming station 200K as described above, there is a difference in the wear volume between the color image forming stations 200Y, 200M and 200C and the black image forming station 200K. As a result, there may occur a difference in toner charging amount between the color photoconductive drums 201Y, 201M, and 201C and the black photoconductive drum 201K. The difference in toner charging amount may cause an image defect because the toner image is not uniformly transferred onto the sheet S in the secondary transfer step. Therefore, the black photoconductive drum 201K is provided with the pre-transfer charger 219 including a corona charger in order to adjust the toner charging amount to those of the other photoconductive drums.

As described above, according to the configuration of the present exemplary embodiment, it is possible to provide the image forming apparatus 101 that stably achieves high image quality without being significantly affected by the ratio between full-color image formation and monochrome image formation.

(Configuration Outline of Exterior Cover in Housing of Image Forming Unit)

Figure 10A:
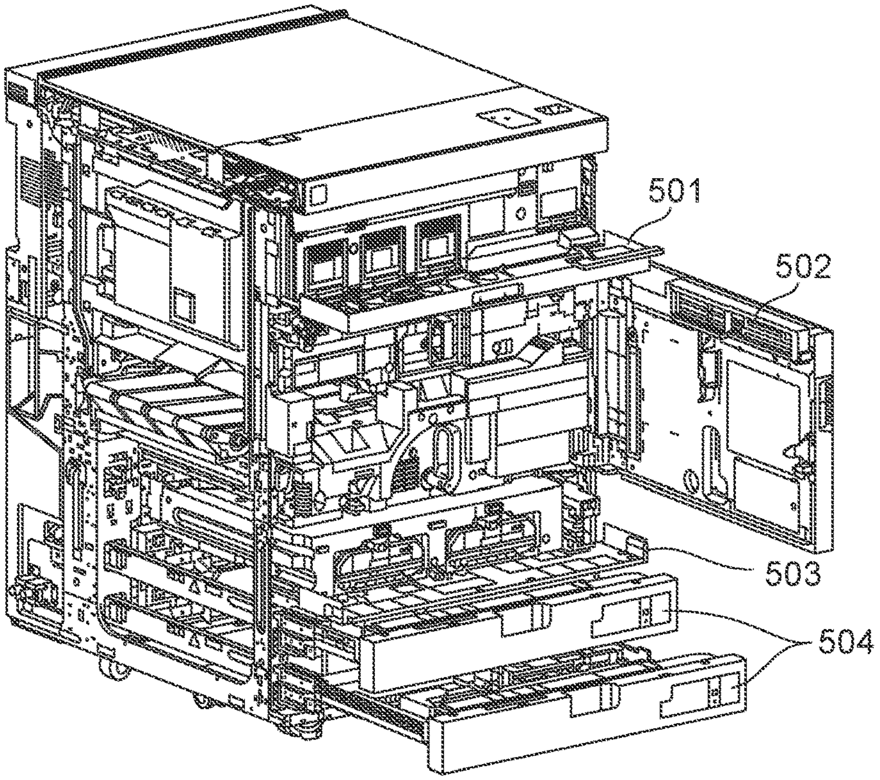
FIG. 10A to 10C are diagrams illustrating an issue with an exterior of an image forming unit in a comparative device.

The image forming unit 102 of the image forming apparatus 101 in the present exemplary embodiment is provided with a large number of elements requiring user maintenance. Therefore, as illustrated in FIGS. 5B and 10A, the front side of the device is mostly constituted by exterior covers that are all openable and closable.

Specifically, the front side of the device is constituted by a toner bottle door 501 that is opened and closed for replacement of the tonner bottle 205Y, 205M, 205C, or 205K in which toner is used up, a front door 502 that is opened and closed for removal of jammed sheets or regular maintenance, a collection container door 503 that is opened and closed for replacement of the collected toner containers 211 that is filled with collected toner, and sheet storage parts 212 that include cassette covers 504 as exterior members to be drawn out in the frontward direction from the device in order to supply sheets.

The above-described three doors are classified into two types of doors that rotate in different rotary directions. The toner bottle door 501 and the collection container door 503 each include a horizontal hinge 512 at the lower end of each door, and are connected to a housing (not illustrated) that stores the image forming unit 102 via the horizontal hinges 512. Each horizontal hinge 512 includes a rotational shaft extending in the horizontal direction. When the toner bottle door 501 and the collection container door 503 rotate around the respective rotational shafts, the toner bottle door 501 and the collection container door 503 are opened or closed with respect to the housing of the image forming unit 102. The front door 502 includes a vertical hinge 513 at the right end portion in the horizontal direction, and is connected to the housing via the horizontal hinge 512. The vertical hinge 513 includes a rotational shaft that extends in the up-down direction that is a vertical direction, and the front door 502 rotates around the rotational shaft with respect to the housing. In the present exemplary embodiment, the vertical hinge 513 is provided at the right end portion of the front door 502 in the front view of the image forming apparatus 101, but the position of the vertical hinge 513 is not limited to this. That is, the vertical hinge 513 may be provided at the left end portion of the front door 502. Also, in the toner bottle door 501 and the collection container door 503, the horizontal hinge 512 may be provided at the upper ends of the doors. Further, in the present exemplary embodiment, the image forming apparatus includes both the door connected by the vertical hinge 513 and the doors connected by the horizontal hinges 512. However, the present exemplary embodiment is not limited to this, and all the doors may be connected by the vertical hinges 513 or all the doors may be connected by the horizontal hinges 512.

It is difficult to stably install the doors at designed nominal positions in the closed state, due to deviation or wobbling caused by the configurations of the hinges of the doors and errors in attachment of the doors.

Figure 10B:
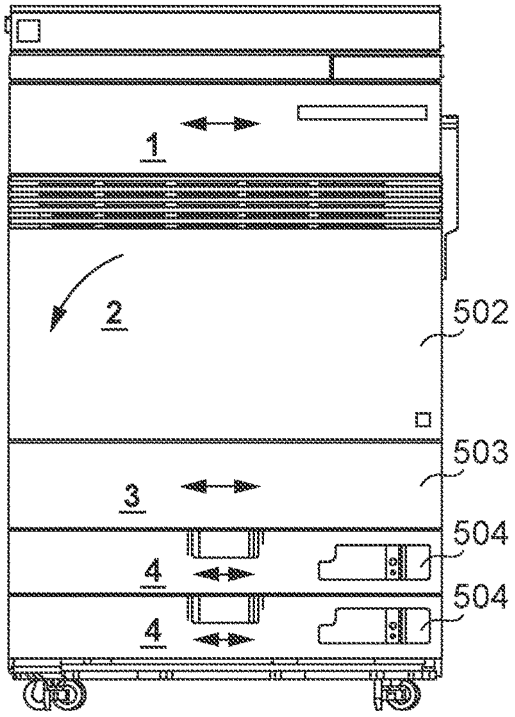

FIG. 10A illustrates an image forming apparatus that does not include projections 551 to 554 and positioning holes 602 according to the present exemplary embodiment. As described above, the toner bottle door 501 and the collection container door 503 are connected to the housing via the horizontal hinges 512. The horizontal hinges 512 may wobble in the direction of the rotational shafts of the hinges. Thus, when the toner bottle door 501 and the collection container door 503 are closed, there may occur deviations from the designed nominal positions in the horizontal direction indicated by arrow 1 and arrow 3 in FIG. 10B.

Figure 10C:
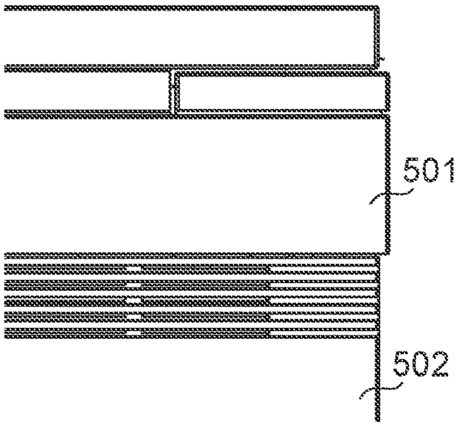

FIG. 10C illustrates the state where the position of the closed toner bottle door 501 is deviated from the designed nominal position. As illustrated in FIG. 10C, when the toner bottle door 501 is shifted in position, there may occur misalignment in the horizontal direction between the relative positions of the toner bottle door 501 and the front door 502 that is adjacent to the toner bottle door 501 in the up-down direction.

On the other hand, the front door 502 is configured to abut against the end in the downward direction when thrust play occurs in the direction of a hinge shaft (not illustrated) of the front door 502, so that, when the front door 502 is closed, the position of the front door 502 is stabled in the height direction on the rotation center side. However, the front door 502 tends to incline in a direction indicated by arrow 2 in FIG. 10B due to poor fitting of the hinge shaft (not illustrated) and the influence of its own weight.

The positional shift caused by the play of the hinge can be reduced by using a high-accuracy hinge, but in that case, there is an issue of cost increase.

The sheet storage parts 212 generally have their own unique positioning configuration for stable sheet feeding performance in the closed state (the sheet feeding-enabled state). In most cases, however, the sheet feeding position is set by adjusting the position of the sheet storage part 212 itself under the influence of components involving in sheet conveyance from sheet feeding to image transfer, assembly tolerance, and installation environment. Accordingly, it is often difficult to align the relative positions of the cassette cover 504 attached to each sheet storage part 212 and the other exterior covers.

In an image forming apparatus having a plurality of rotary doors as in the image forming apparatus 101 according to the present exemplary embodiment, the positions of the doors 502 to 504 with respect to the housing are set as designed values such that the end portions of the doors 502 to 504 align with one another in the horizontal direction in consideration of the aesthetic appearance. In the present exemplary embodiment, if a misalignment between the relative positions of the end portions of the adjacent doors in the horizontal direction is 2 mm or less, it is defined that the end portions of the doors 502 to 504 align with each other in the horizontal direction. Regulating the misalignment between the positions of the end portions in the horizontal direction to 2 mm or less can give users an impression that the end portions of the doors 502 to 504 in the closed state align with each other in the horizontal direction. However, if the positions of the doors 502 to 504 in the closed state with respect to the housing are deviated from the design values due to the positional shifts described above, the misalignment between the relative positions of the adjacent doors in the horizontal direction may be 2 mm or more.

In a design in which corner portions or edges are prominent in the shapes of the exterior members as in the image forming apparatus 101 according to the present exemplary embodiment, there is an issue that misalignment between the relative positions of the exterior covers is noticeable in particular.

(Positioning Configuration of Openable and Closable Exterior Cover According to Present Invention)

Figure 5A:
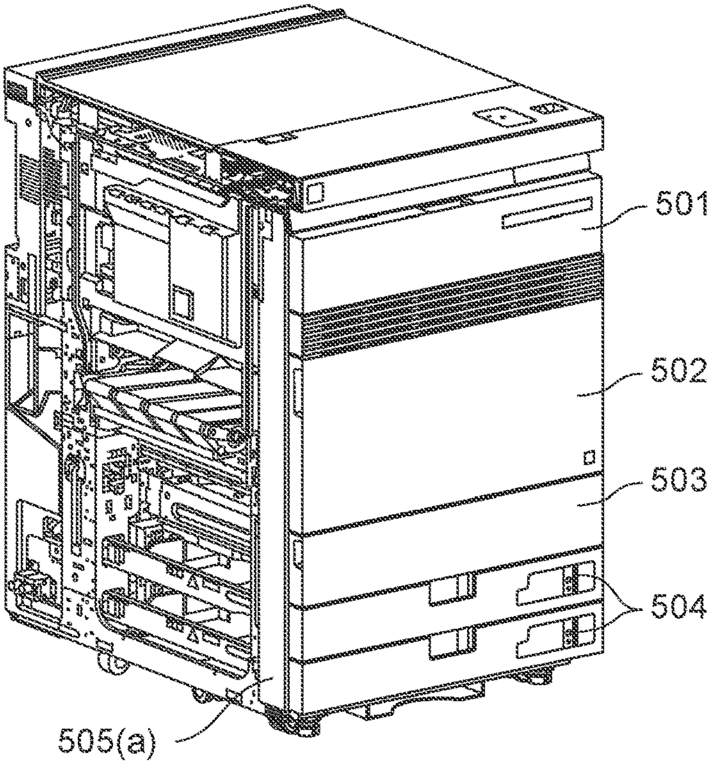
FIGS. 5A and 5B are perspective views of the image forming unit.
Figure 5B:
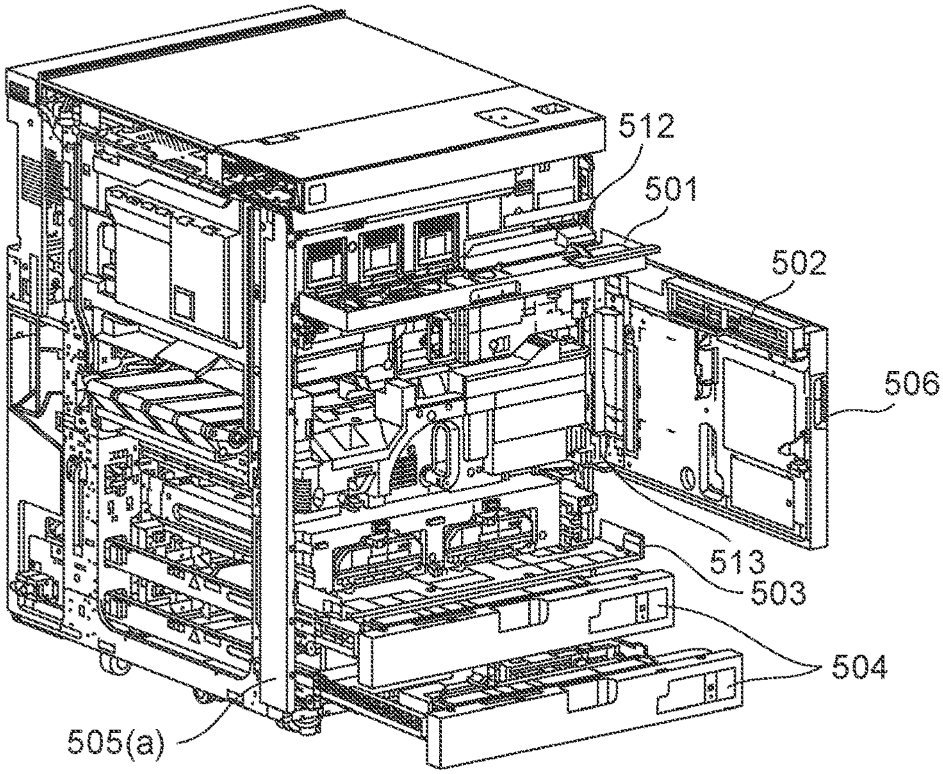

The image forming apparatus 101 according to the present exemplary embodiment includes a left cover 505(*a*) on the front portion of the left side surface of the image forming unit 102 as illustrated in FIGS. 5A and 5B. Although described below in detail, a plurality of fitting holes into which a plurality of projections including a projection 552 is fitted is formed on the left cover 505(*a*).

Figure 6A:
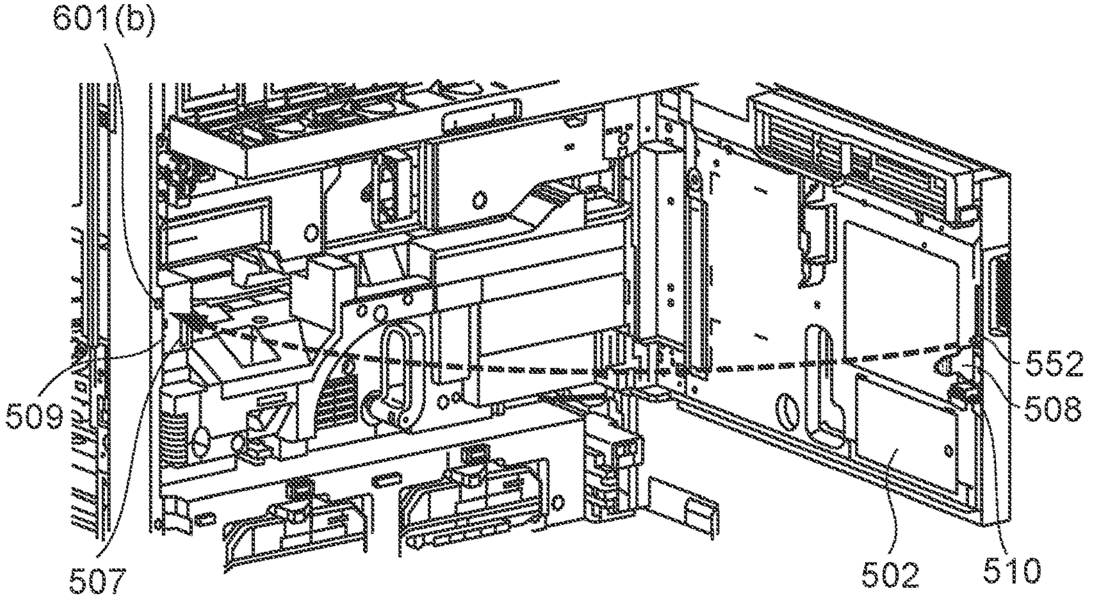
FIGS. 6A and 6B are diagrams illustrating opening and closing of a front door.
Figure 6B:
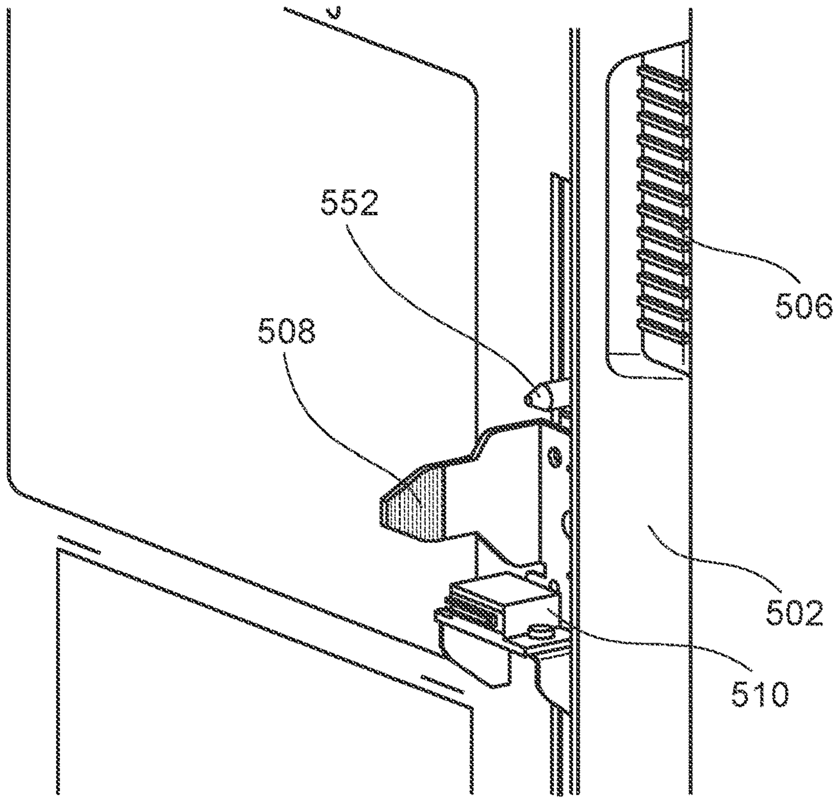

FIG. 6A illustrates the front door 502 in the opened state with respect to the housing, and FIG. 6B illustrates a handgrip 506 of the front door 502 and its vicinity in an enlarged view. Since the front door 502 is provide with the handgrip 506, the front door 502 can be opened and closed by grabbing the handgrip 506. The front door 502 is provided with a magnet 510 on the inner side and the housing is provided with a metallic part 509. When the front door 502 is in the closed state, the magnet 510 attracts the metallic part 509 to hold the front door 502 in the closed state. In order to open the closed front door 502, it is necessary to exert a force stronger than the force of the magnet 510 attracting the metallic part 509, so that it is possible to reduce the risk of the closed front door 502 becoming accidentally opened. In the present exemplary embodiment, the attraction force between the magnet 510 and the metallic part 509 is used as a mechanism for holding the front door 502 in the closed state. However, another mechanism may be used as far as it can hold the front door 502 in the closed state. Further, in the present exemplary embodiment, the housing is provided with an open/close sensor 507, and the front door 502 is provided with an open/close sensor projection 508 on its inner side. The open/close sensor 507 is shaped such that the open/close sensor projection 508 is insertable thereinto. When the front door 502 is in the closed state, the open/close sensor projection 508 is inserted into the open/close sensor 507, so that the open/close sensor 507 detects that the front door 502 is in the closed state. The open/close sensor projection 508 is inserted into the open/close sensor 507 when the front door 502 is closed, but does not have a function of restricting the position of the closed front door 502 and has a function different from those of projections 551 to 554 and positioning holes 601 described below. The front door 502 is further provided with a projection 552 on the inner side, and the left cover 505(*a*) is provided with a positioning hole 601(*b*) into which the projection 552 is fitted when the front door 502 is in the closed state. The projection 552 is shaped such that its diameter is smaller as the distance from the front door 502 is larger, and is shaped so as to be guided into the positioning hole 601(*b*) when the front door 502 is closed. The projection 552 and the positioning hole 601(*b*) are provided such that when the front door 502 is in the closed state and the projection 552 fits into the positioning hole 601(*b*), the position of the front door 502 meets the design value. Therefore, even if there occurs play of the horizontal hinge 512 or a positional shift of the front door 502 at the time of attachment, fitting the projection 552 into the positioning hole 601(*b*) makes it possible to set the position of the front door 502 with respect to the housing to the position of the design value.

As illustrated in FIG. 6B, the projection 552 protrudes in a direction away from the front door 502, and is tapered such that the cross section area is reduced as the distance from the front door 502 increases. Forming the shape of the projection 552 as described above makes it possible to guide the projection 552 to the positioning hole 601(*b*) even if the centers of the projection 552 and the positioning hole 601(*b*) are not aligned. The projection 551 and the projection 553 described below have the same shape. The shapes of the projection 552 and the positioning hole 601(*b*) are not limited to those described above, and the positioning hole 601(*b*) may be tapered such that the opening area is reduced in the insertion direction of the projection 552. The projections 551 to 553 may not be all identical in shape but may be different in shape. In addition, the projections 551 to 553 may have a shape with a uniform cross section area.

Figure 7A:
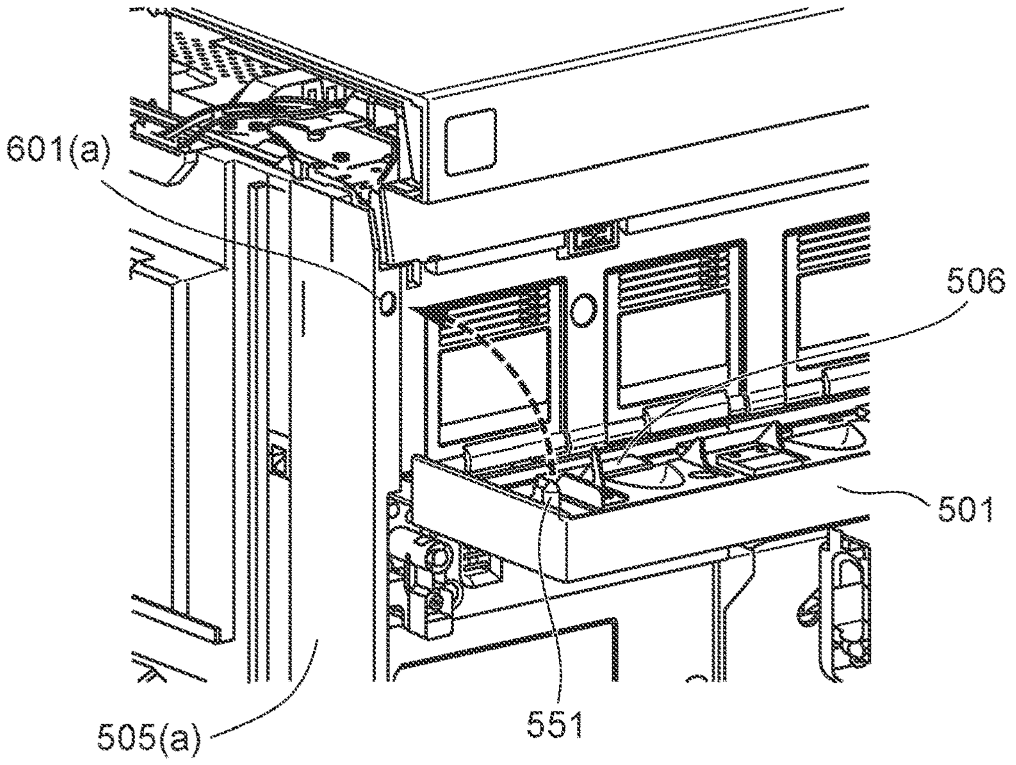
FIGS. 7A and 7B are diagrams illustrating opening and closing of a toner bottle door.
Figure 7B:
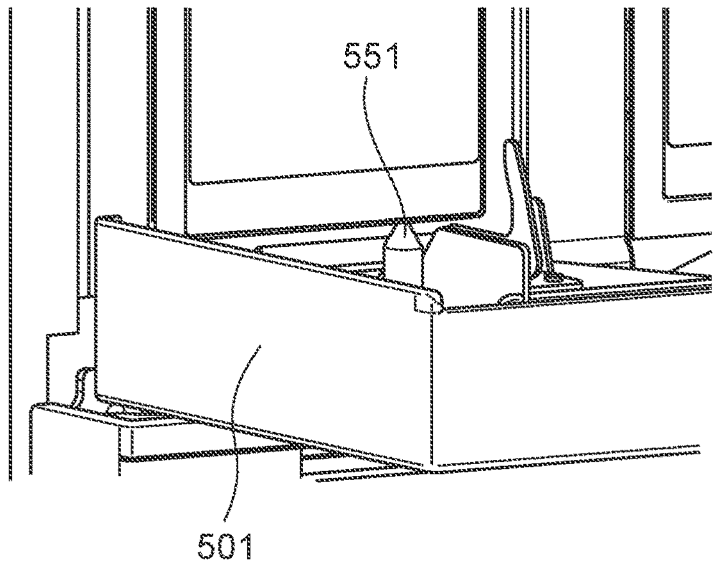

FIGS. 7A and 7B illustrate the toner bottle door 501 in the opened state with respect to the housing. The toner bottle door 501 is also provided with the magnet 510 (not illustrated in FIGS. 7A and 7B) on the inner side of the toner bottle door 501. When the toner bottle door 501 is in the closed state, the magnet 510 attracts the metallic part 509 (not illustrated in FIGS. 7A and 7B) to hold the toner bottle door 501 in the closed state.

Similarly to the front door 502, the toner bottle door 501 is provided with the open/close sensor projection 508 (not illustrated in FIGS. 7A and 7B). When the toner bottle door 501 is in the closed state, the open/close sensor projection 508 is inserted into the open/close sensor 507 (not illustrated in FIGS. 7A and 7B), so that the open/close sensor 507 detects that the toner bottle door 501 is in the closed state. Further, similarly to the front door 502, the toner bottle door 501 is provided with the projection 551. When the toner bottle door 501 is in the closed state, the projection 551 fits into a positioning hole 601(*a*). Thus, the position of the toner bottle door 501 with respect to the housing can be set to the position of the design value even if play of the vertical hinge 513 or a positional shift of the toner bottle door 501 at the time of attachment occurs.

Figure 8A:
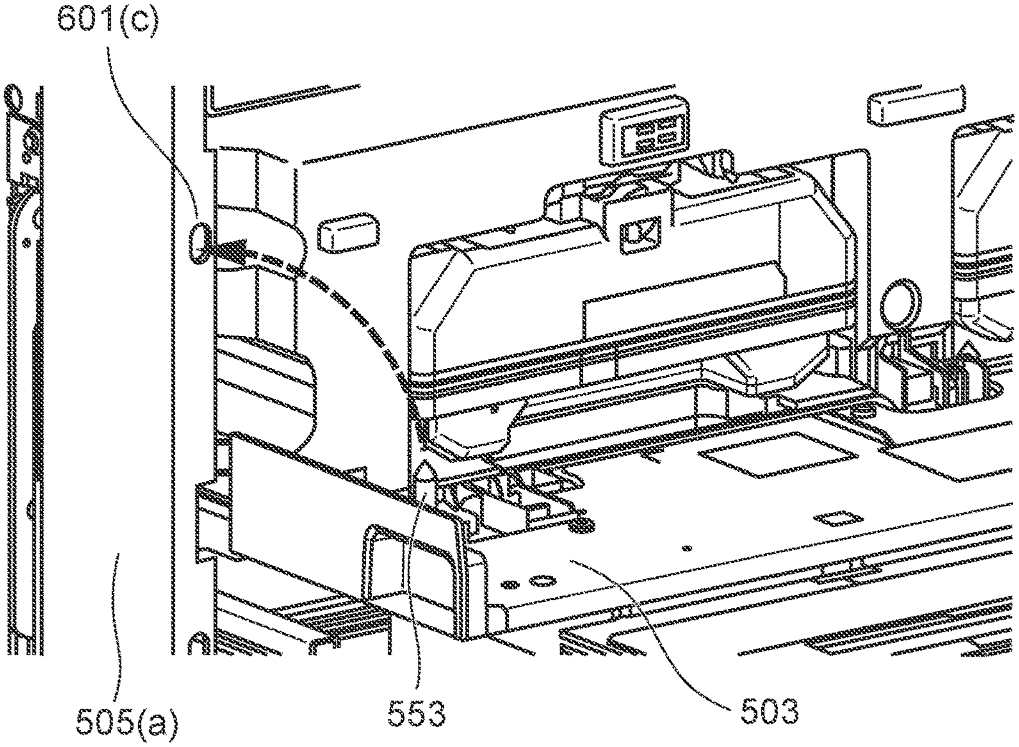
FIGS. 8A and 8B are diagrams illustrating opening and closing of a collection container door.
Figure 8B:
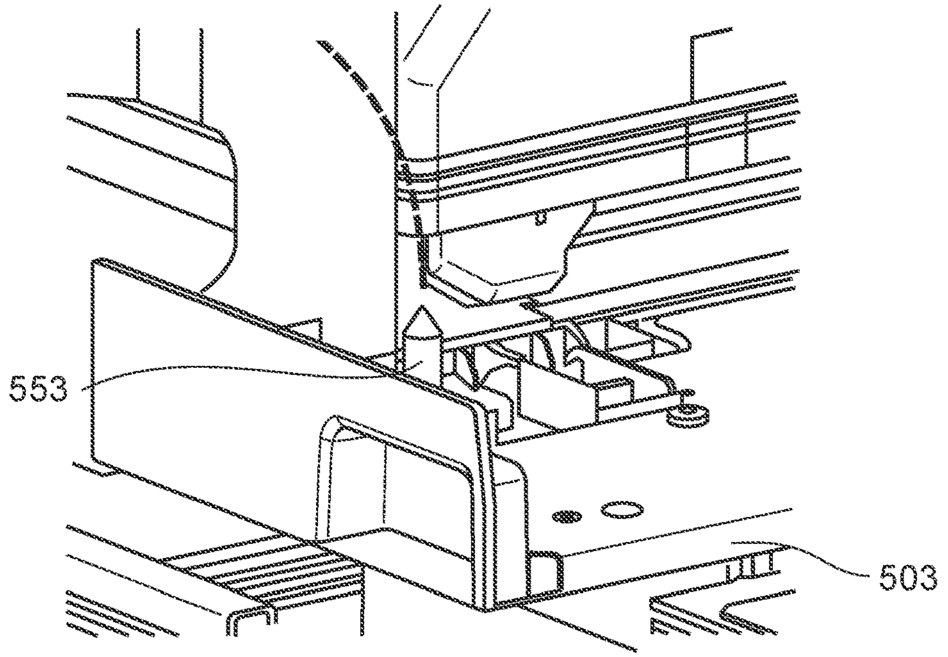

FIGS. 8A and 8B illustrates the collection container door 503 in the opened state with respect to the housing. The collection container door 503 is also provided with the magnet 510 (not illustrated in FIGS. 8A and 8B) on the inner side of the collection container door 503. When the collection container door 503 is in the closed state, the magnet 510 attracts the metallic part 509 (not illustrated in FIGS. 8A and 8B) to hold the collection container door 503 in the closed state. Similarly to the front door 502, the collection container door 503 is provided with the open/close sensor projection 508 (not illustrated in FIGS. 8A and 8B). When the collection container door 503 is in the closed state, the open/close sensor projection 508 is inserted into the open/close sensor 507 (not illustrated in FIGS. 8A and 8B), so that the open/close sensor 507 detects that the collection container door 503 is in the closed state. Further, similarly to the front door 502, the collection container door 503 is provided with the projection 553. When the collection container door 503 is in the closed state, the projection 553 fits into a positioning hole 601(*c*). Thus, the position of the collection container door 503 with respect to the housing can be set to the position of the design value even if play of the horizontal hinge 512 or a positional shift of the collection container door 503 at the time of attachment occurs.

As described above, when the toner bottle door 501, the front door 502, and the collection container door 503 are closed, the projections 551 to 553 fit into the positioning holes 601(*a*) to 601(*c*), respectively. Therefore, the positions of the toner bottle door 501, the front door 502 and the collection container door 503 in the closed state with respect to the housing are set to the positions of the design values, so that the positions of the end portions of the toner bottle door 501, the front door 502 and the collection container door 503 can be aligned with one another in the horizontal direction.

Figure 9:
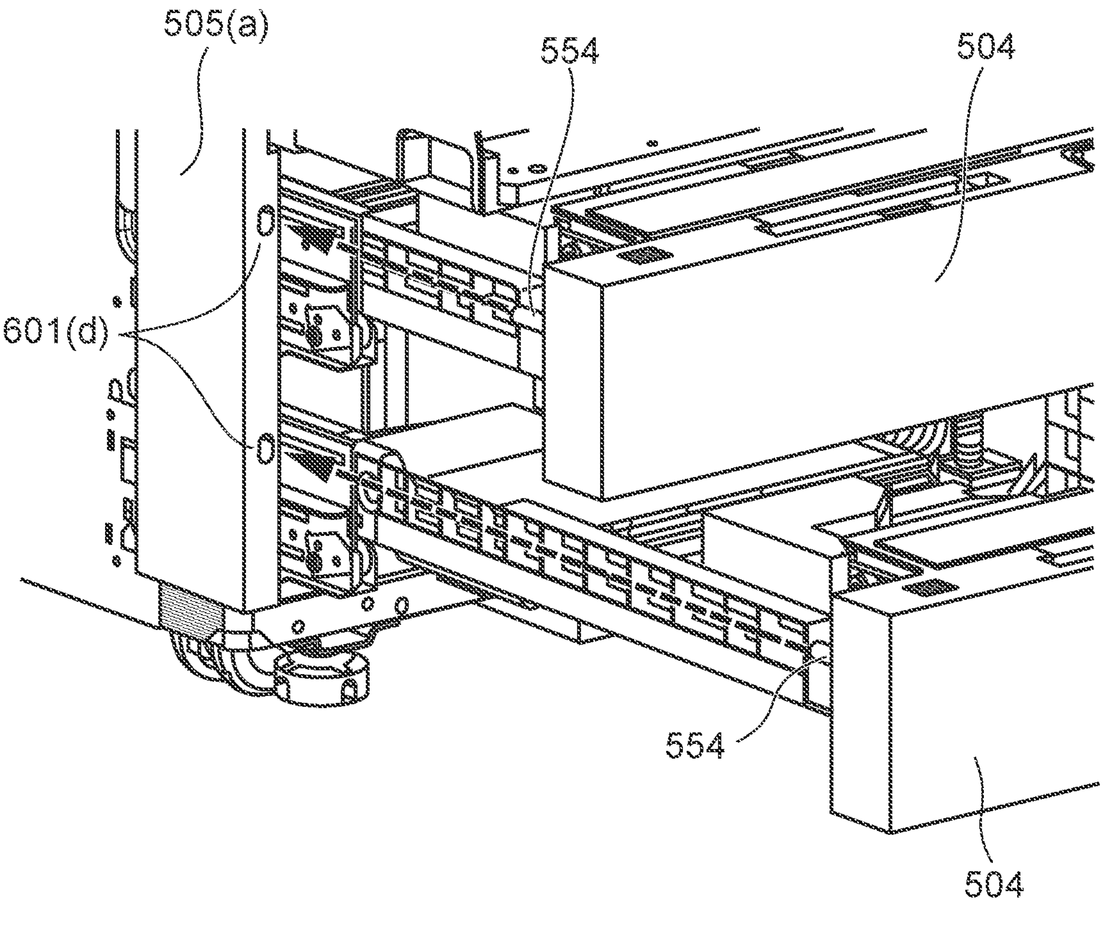
FIG. 9 is a diagram illustrating insertion and removal of a cassette.

FIG. 9 illustrates the cassette covers 504 in the opened state with respect to the housing. In a case where the sheet storage parts 212 have their own unique positioning configuration as described above, the projection 554 of each cassette cover 504 may not be properly inserted into a positioning hole 601(*d*) when the cassette is closed. Thus, providing a fixing unit (not illustrated) in each cassette cover 504 that allows the cassette cover 504 to be freely movable by a predetermined amount in the horizontal direction with respect to the sheet storage part 212 makes it possible to achieve smooth fitting of the cassette covers 504 and easy alignment with other doors and exterior parts.

In the present exemplary embodiment, the left cover 505(*a*) having the function of positioning the openable and closable exterior covers is provided on the left side surface of the image forming unit 102. However, the same advantageous effect can be achieved by providing a cover having the same function on the right side surface of the image forming unit 102.

In addition, in the present exemplary embodiment, the positioning holes 601 formed in the left cover 505(*a*) are vertically long holes and are provided to perform horizontal positioning alone. In order to perform positioning of the doors in the height direction, a cover member having the same positioning function as the left cover is provided on the right and left sides, the positioning holes in one of the cover members are made circular, and the positioning holes in the other cover member are made long in the horizontal direction. This configuration makes it possible to properly position the doors.

In the present exemplary embodiment, the positioning holes 601(*a*) to 601(*c*) provided in the left cover 505(*a*) are arranged in a line along the vertical direction. Providing the positioning holes 601 as described above makes it easy to attach the doors 501 to 503 to the housing. The positions of the positioning holes 601 are not limited to the above-described positions, and can be set to any positions where, when the projections 551 to 553 are fitted, the positions of the doors 501 to 503 with respect to the housing meet the positions of the design values.

Further, in the present exemplary embodiment, the projections are provided on the openable and closable exterior covers, and the positioning holes 601 are provided in the left cover 505(*a*). However, the same advantageous effect can be achieved by providing the positioning holes in the openable and closable exterior covers and providing the projections on the left cover 505(*a*).

A second exemplary embodiment will be described. The configuration related to image formation in the second exemplary embodiment is the same as that of the image forming apparatus 101 in the first exemplary embodiment, and thus description thereof will be omitted.

The toner bottle door 501 and the collection container door 503 in the first exemplary embodiment each include the hinge configuration at the lower end of the door, and are opened and closed in the up-down direction around the rotation center at the lower end of the door as described in FIGS. 5A and 5B, and the projections 551 and 553 provided on the toner bottle door 501 and the collection container door 503 fit into the positioning holes 601(*a*) and 601(*c*) provided in the left cover 505(*a*), respectively, so that the doors are positioned.

However, it is presumed that there may be no space for providing the positioning holes in the left cover 505(*a*) depending on the configuration of the image forming unit 102.

Figure 11:
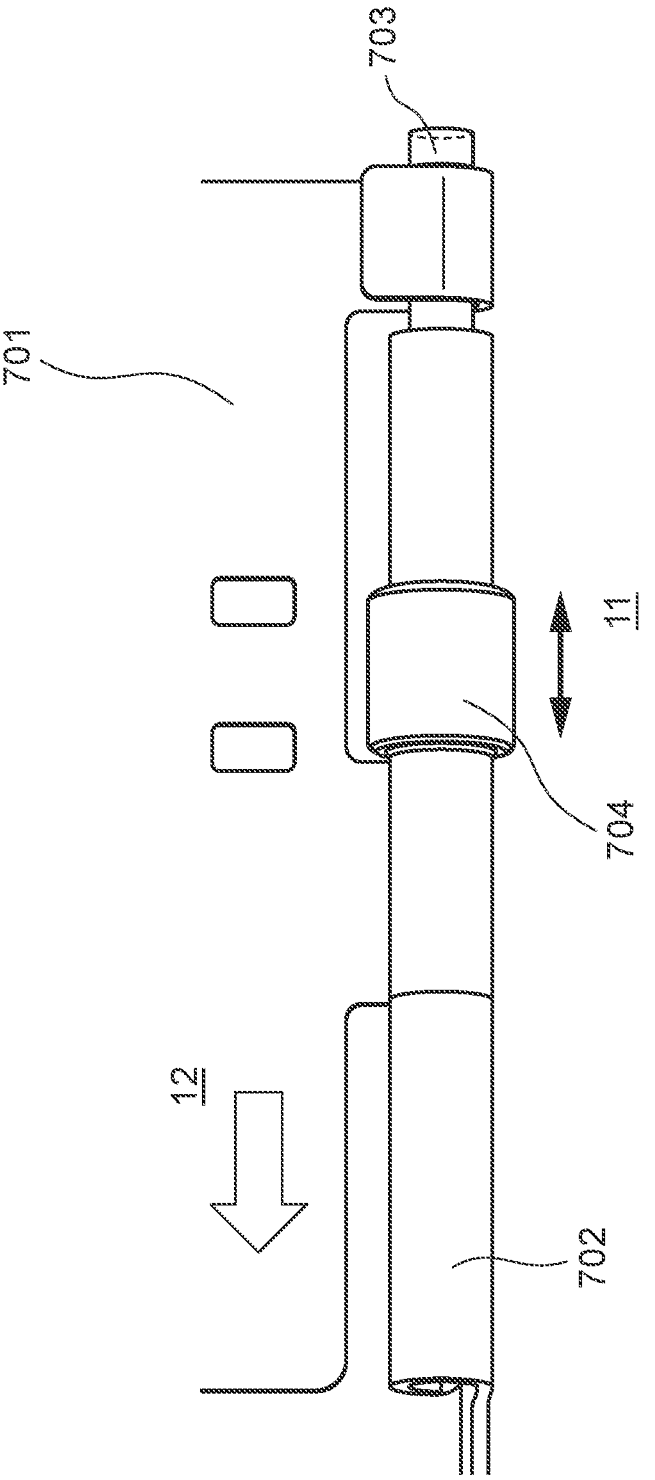
FIG. 11 is a diagram illustrating a hinge part biasing unit according to a second exemplary embodiment.
Figure 12:
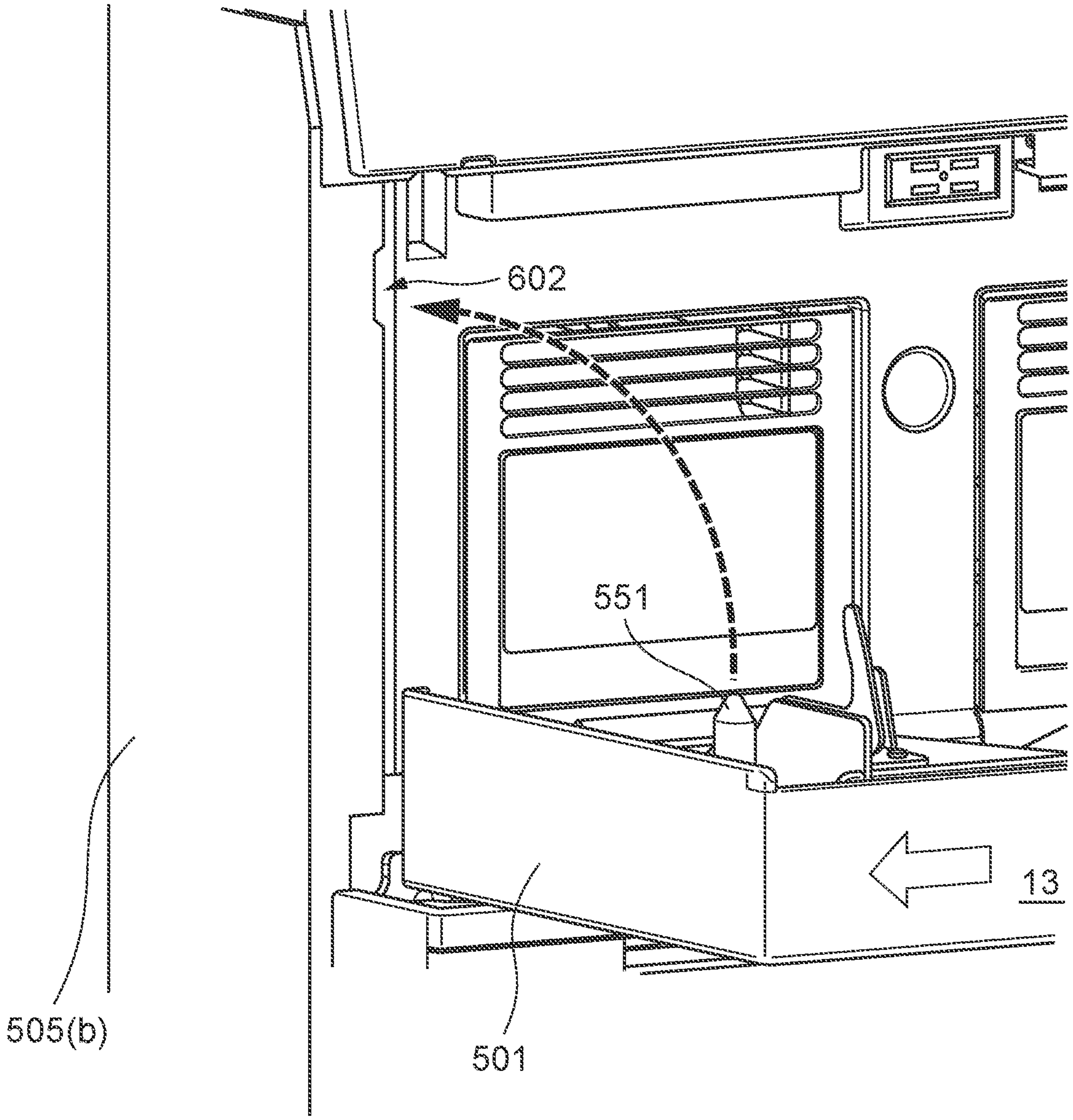
FIG. 12 is a diagram illustrating opening and closing of a toner bottle door according to the second exemplary embodiment.

As illustrated in FIG. 11, in a hinge part including a hinge shaft 703 that fits into the rotating part of a hinge plate 701 of a toner bottle door 501 and to a hinge base 702 on the main body side, a compression spring 704 that tends to extend in both directions shown by arrow 11 is interposed to bias the hinge plate 701 in the direction of arrow 12 in FIG. 11. That is, the toner bottle door 501 itself is biased toward the left side of the main body (biased in the direction of arrow 13 in FIG. 12) so that thrust play is shifted in the axial direction of the hinge part. On the other hand, as illustrated in FIG. 12, a left cover 505(*b*) is provided with an abutment part 602 instead of a positioning hole.

According to the configuration described above, the toner bottle door 501 is always biased in the left direction of the main body. When the door is being closed, the side surface of a projection 551 abuts the abutment part 602 of the left cover 505(*b*) so that the toner bottle door 501 itself is positioned in the state of being shifted to the left.

The above description has been made taking the toner bottle door 501 as an example. A collection container door 503 can be similarly positioned by providing the same configuration.

In addition, the above description has been made taking the cover member on the left side of the main body as an example. The same advantageous effect can be achieved by providing the same configuration on the right side.

Further, the same advantageous effect can be achieved by providing the projections on the covers and the abutment parts on the doors.

The same advantageous effect can be achieved by selectively choosing for each door the positioning configuration in the first exemplary embodiment and the configuration in the second exemplary embodiment.

According to the present disclosure, in an image forming apparatus including a plurality of doors, it is possible to reduce misalignment between relative positions of adjacent doors in the horizontal direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-065263, filed Apr. 12, 2023, which is hereby incorporated by reference herein in its entirety.

What is claimed is:

1. An image forming apparatus including an image forming unit configured to form an image on a sheet, the image forming apparatus comprising:

a housing configured to store the image forming unit;

a plurality of doors, each of which rotates around a rotational axis so as to be opened and closed with respect to the housing and includes a positioning shaft and a projection, wherein, when each of the plurality of doors is in an opened state, an inside of the image forming apparatus is exposed;

a cover part that has a plurality of fitting holes into which the positioning shafts are fitted;

a plurality of holding members, each of which holds a different one of the plurality of doors in a closed state;

a sheet storage part configured to store the sheet; and a sheet cassette cover attached to the sheet storage part wherein, when each of the plurality of doors is in the closed state, each of the positioning shafts included in the plurality of doors is fitted into a different one of the plurality of fitting holes, wherein the plurality of doors and the sheet cassette cover are arranged in a vertical direction, and wherein the sheet cassette cover is configured to be adjustable in a horizontal direction with respect to the sheet storage part for alignment with the plurality of doors.

2. The image forming apparatus according to claim 1, wherein, among the plurality of doors, two doors adjacent to each other in the vertical direction are identical in width in the horizontal direction, and when the two doors adjacent to each other are in the closed state, end portions of the two doors in the horizontal direction are located at an identical position in the horizontal direction.

3. The image forming apparatus according to claim 1, wherein a first door that is at least one door of the plurality of doors rotates around a rotational axis extending in the vertical direction, wherein a second door that is at least one door of the plurality of doors rotates a rotational axis extending in the horizontal direction, and wherein the first door and the second door are adjacent to each other in the vertical direction.

4. The image forming apparatus according to claim 1, wherein each of the plurality of doors includes the projection, and wherein the image forming apparatus further comprises a plurality of sensors, each of which detects that a different one of the plurality of doors is in the closed state by detecting a different one of the plurality of projections included in the plurality of doors.

5. The image forming apparatus according to claim 1, wherein the plurality of fitting holes is provided along the vertical direction.

6. The image forming apparatus according to claim 1, wherein each of the positioning shafts included in the plurality of doors protrudes in a direction away from a different one of the plurality of doors, and each of cross section areas of the positioning shafts is reduced as a distance from the different one of the plurality of doors increases.

7. The image forming apparatus according to claim 1, wherein, when one of the positioning shafts included in a door of the plurality of doors is fitted into a different one fitting hole of the plurality of fitting holes, where the different one fitting hole restricts a position of the door provided with the fitted positioning shaft in the horizontal direction.

8. The image forming apparatus according to claim 7, wherein, when one of the positioning shafts included in a door the plurality of doors is fitted into a different one fitting hole of the plurality of fitting holes, the one different fitting hole restricts a position of the door provided with the fitted positioning shaft in the vertical direction.

9. The image forming apparatus according to claim 1, further comprising a plurality of metallic parts, wherein each of the plurality of doors includes a magnet, and wherein, when each of the plurality of doors is in the closed state, each of the plurality of magnets included in the plurality of doors attracts a different one of the plurality of metallic parts.

10. The image forming apparatus according to claim 1, wherein, among the plurality of doors, two doors adjacent to each other are provided side by side in the vertical direction, and wherein the two doors adjacent to each other are identical in length in the horizontal direction, and when the two doors are in the closed state, a difference between relative positions of end portions of the two doors in the horizontal direction is less than 2 millimeters (mm).

11. The image forming apparatus according to claim 1, further comprising:

a plurality of sensors, each of which detects that a different one of the plurality of doors is in the closed state by detecting a different one of the plurality of projections included in the plurality of doors, wherein, when each of the plurality of doors is in the opened state, the image forming unit is accessible, and wherein, among the plurality of doors, two doors adjacent to each other in the vertical direction are identical in width in a horizontal direction, and when the two doors adjacent to each other are in the closed state, end portions of the two doors in the horizontal direction are located at an identical position in the horizontal direction.

12. The image forming apparatus according to claim 1, wherein each of the plurality of fitting holes is elongated in the vertical direction for positioning the plurality of doors in the horizontal direction.

13. The image forming apparatus according to claim 12, wherein the plurality of fitting holes is provided along the vertical direction.

14. The image forming apparatus according to claim 1, wherein the plurality of doors at least includes two adjacent doors which are arranged in the vertical direction to be adjacent to each other, wherein a first door of the two adjacent doors has a first door length in the vertical direction, and a second door of the two adjacent doors has a second door length in the vertical direction, and wherein the cover part has a cover length in the vertical direction which is longer than at least a sum of the first door length and the second door length.

* * * * *